Figure 3:
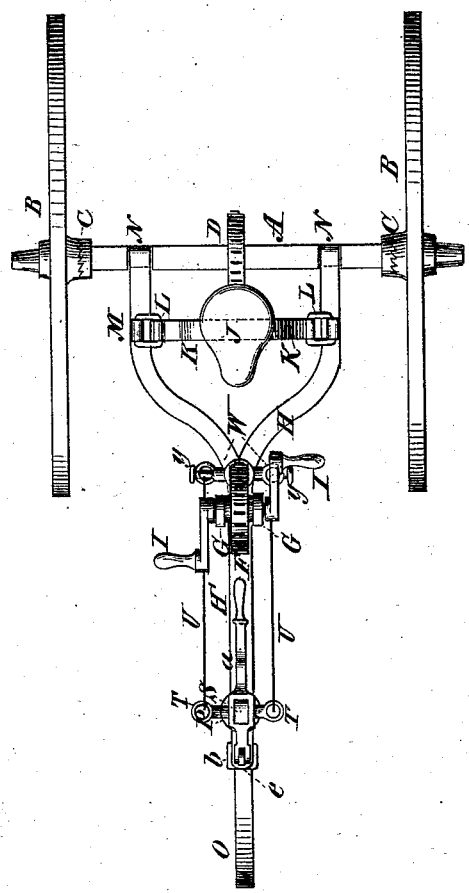

(No Model.) 2 Sheets—Sheet 1.
W. H. HULL & J. W. O'REAR.
VELOCIPEDE.
No. 259,853. Patented June 20, 1882.
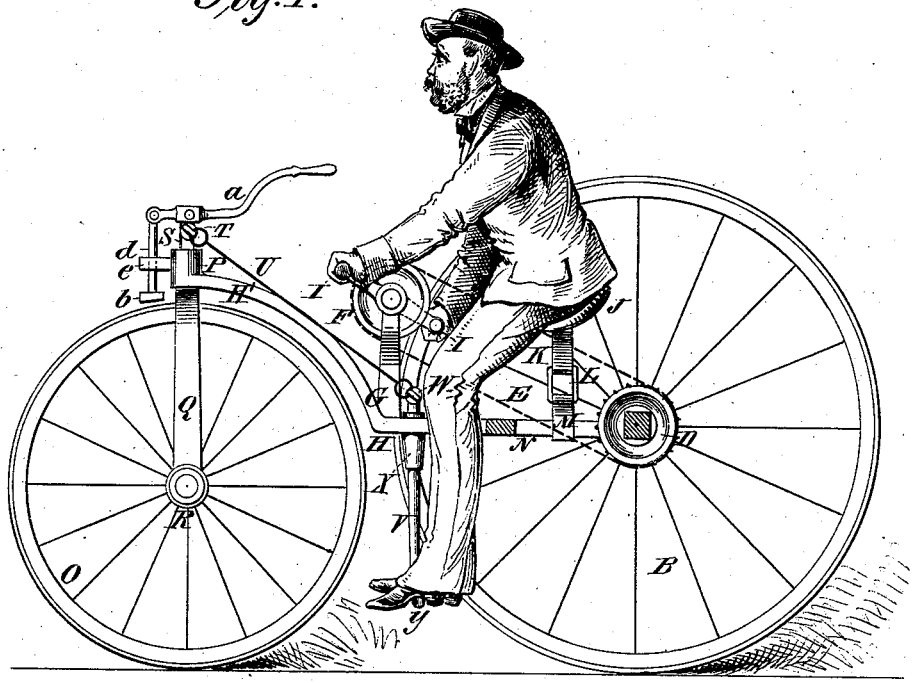
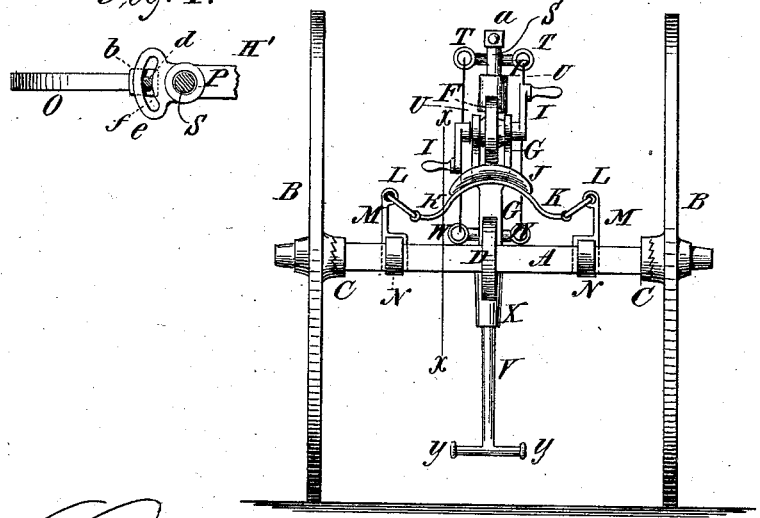
WITNESSES:
Gustave Dieterich
C. Sedgwick
INVENTOR:
W. H. Hull
J. W. O'Rear
BY Munn & Co
ATTORNEYS.

(No Model.) 2 Sheets—Sheet 2.
W. H. HULL & J. W. O'REAR.
VELOCIPEDE.

No. 259,853. Patented June 20, 1882.

WITNESSES:
Gustave Dieterich
C. Sedgwick

INVENTOR:
W. H. Hull
J. W. O'Rear
BY Munn & Co.
ATTORNEYS.

UNITED STATES PATENT OFFICE.

WELCOME H. HULL AND JAMES W. O'REAR, OF WHITE HALL, VIRGINIA.

VELOCIPEDE.

SPECIFICATION forming part of Letters Patent No. 259,853, dated June 20, 1882.

Application filed March 18, 1882. (No model.)

*To all whom it may concern:*

Be it known that we, WELCOME H. HULL and JAMES W. O'REAR, of White Hall, Frederick county, Virginia, have invented a new and Improved Vehicle, of which the following is a full, clear, and exact description.

This invention consists of the construction and arrangement, as hereinafter described, of a vehicle of three wheels, to be propelled and guided by the rider, the driving-power being applied by means of hand-cranks and the guiding being effected by the foot of the operator.

Reference is to be had to the accompanying drawings, forming a part of this specification, in which similar letters of reference indicate corresponding parts in all the figures.

Figure 1, in the accompanying drawings, is a side view of our improved vehicle, the rear portion being sectioned through the axle on line $x\ x$, Fig. 2. Fig. 2 is a rear elevation. Fig. 3 is a plan view, and Fig. 4 is a detail of the brake mechanism.

A represents the hind axle, whereon the two hind wheels, B, are fitted by means of the well-known rose-clutch device C, for allowing one wheel to overrun the other in going around curves, and D represents a pulley applied to the axle at the middle, or thereabout, for driving it by a chain or other belt, E, from the driving-pulley F, mounted in the top of the forked standard G, supported on the frame H, and turned by hand-cranks I, to be worked by the operator, who sits upon the saddle J, which has a spring-extension, K, each side of it, connected by a link, L, to a standard, M, supported on the branches N of the frame, which extend to and connect with the hind axle, while the front portion, H', of the frame curves upward at the front, where standard G is attached, from the level of the hind axle to the front, over the center of the front wheel, O, where it terminates in a socket, P, for connecting with and resting on the forked upright Q of the front axle, R, the stem S of said frame Q extending up through said socket and carrying the arms T, which are connected by rods U with corresponding arms W upon the top of the upright V, which extends downward through socket X of the frame, behind the post G, and has arms Y for the application of the feet of the operator to steer the vehicle. The stem S also carries the lever $a$, which is pivoted to it above arms T, for working the brake $b$, said brake being fixed on the vertically-operating rod $d$, arranged in the slotted supporting-arm $e$ of frame-socket P for a guide, the said slot $f$ allowing rod $d$ to turn with the wheel and upright Q in advance of the wheel center, while the lever ranges rearward toward the operator for being conveniently worked by hand.

As shown in the drawings, the brake is arranged to be applied to the wheel by an upward movement of the handle end of lever $a$; but it is evident that the vertically-moving brake-shoe bar $d$ may be pivoted at its upper end to lever $a$, back of said lever's connection with stem S, said bar $d$ to be guided in an opening through the front portion, H', of the frame to admit of application of the brake-shoe $b$ to the wheel O, behind the stirrup Q, instead of in front of it, and by a downward movement of the handle end of lever $a$, as will be readily understood.

The construction is very simple and cheap, and the arrangement is calculated to afford a convenient and easily-operated hand-power vehicle.

By contriving the saddle to arch over the center space, where it is desirable to locate the driving-belt, the latter is afforded the necessary space, while the operator's position is free and unobstructed to him.

Having thus described our invention, we claim as new and desire to secure by Letters Patent—

1. The frame H, having the forked arms N connected to the hind axle, A, and supporting the seat J, having spring-extensions K connected to said arms by links L, and standards M, substantially as specified.

2. A velocipede-saddle having the elastic side extensions, K K, in combination with the link L, standard M, frame-branches N, and axle A, as shown and described.

3. The combination, with the front axle and the socket P on the main supporting-frame, and the frame Q, having a stem, S, passing up through said socket, of the arms T Y, rods U, upright V, having arms W, and the frame having socket X, as and for the purpose specified.

4. The combination, with the front axle having upright Q, with stem S, passing through a socket of the main supporting-frame, of the hand-lever $a$, pivoted to the top of said stem, the rod $d$, pivoted to the end of said lever, the brake on the end of said rod, and the slotted arm $c$ on the socket P, as and for the purpose specified.

WELCOME H. HULL.
JAMES W. O'REAR.

Witnesses:
DAVID L. SMOKE,
EDWARD CANNON.